United States Patent
Li et al.

(10) Patent No.: US 11,606,170 B2
(45) Date of Patent: Mar. 14, 2023

(54) METHOD AND APPARATUS FOR HARQ-ACK AND SR TRANSMISSION

(71) Applicant: Lenovo (Beijing) Limited, Beijing (CN)

(72) Inventors: Hongchao Li, Beijing (CN); Joachim Löhr, Wiesbaden (DE); Lianhai Wu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 168 days.

(21) Appl. No.: 16/959,957

(22) PCT Filed: Jan. 5, 2018

(86) PCT No.: PCT/CN2018/071597
§ 371 (c)(1),
(2) Date: Jul. 2, 2020

(87) PCT Pub. No.: WO2019/134126
PCT Pub. Date: Jul. 11, 2019

(65) Prior Publication Data
US 2021/0111837 A1    Apr. 15, 2021

(51) Int. Cl.
*H04L 1/18* (2006.01)
*H04L 1/1812* (2023.01)
(Continued)

(52) U.S. Cl.
CPC ......... *H04L 1/1812* (2013.01); *H04L 1/1671* (2013.01); *H04L 5/0055* (2013.01); *H04W 72/0413* (2013.01)

(58) Field of Classification Search
CPC ......... H04W 72/1284; H04W 72/0413; H04W 16/28; H04L 1/1812; H04L 1/1671; H04L 5/0055; H04L 1/1861; H01Q 25/00
See application file for complete search history.

(56) References Cited

U.S. PATENT DOCUMENTS

2011/0243103 A1   10/2011   Kowalski et al.
2012/0127869 A1   5/2012    Yin et al.
(Continued)

FOREIGN PATENT DOCUMENTS

CN      106664520 A       5/2017
WO      WO-2017189034 A1 * 11/2017 ........... H04L 5/0096

OTHER PUBLICATIONS

PCT/CN2018/071597, "International Search Report and the Written Opinion of the International Search Authority" ISA/CN, State Intellectual Property Office of the P.R. China, dated Sep. 11, 2018, pp. 1-6.

*Primary Examiner* — Vinncelas Louis
(74) *Attorney, Agent, or Firm* — Kunzler Bean & Adamson (57) ABSTRACT

The present disclosure is directed to a method and apparatus for HARQ-ACK and SR transmission. According to an embodiment of the present disclosure, a method may include: configuring a first PUCCH resource for a HARQ-ACK transmission and a second PUCCH resource for a SR transmission; determining whether the HARQ-ACK transmission in the first PUCCH resource overlaps with the SR transmission in the second PUCCH resource in time domain; and in response to that the HARQ-ACK transmission in the first PUCCH resource overlaps with the SR transmission in the second PUCCH resource, at least dropping the exactly overlapped part of one of the HARQ-ACK transmission in the first PUCCH resource and the SR transmission in the second PUCCH resource.

15 Claims, 4 Drawing Sheets

(51) Int. Cl.
*H04L 1/1607* (2023.01)
*H04L 5/00* (2006.01)
*H04W 72/04* (2023.01)

(56) References Cited

U.S. PATENT DOCUMENTS

2015/0016373 A1\* 1/2015 Hwang ................ H04L 1/1812
370/329
2020/0146037 A1\* 5/2020 Park .................. H04W 72/1284

\* cited by examiner

METHOD AND APPARATUS FOR HARQ-ACK AND SR TRANSMISSION

TECHNICAL FIELD

The present disclosure is directed to wireless communication technology, and more specifically relates to the technology about hybrid automatic repeat request-acknowledge (HARQ-ACK) and scheduling request (SR) transmission.

BACKGROUND

As wireless communication technology develops, flexible physical uplink control channel (PUCCH) resource allocation has been introduced into 5G wireless communication technology. For example, PUCCH format 0 and 2 transmission may start from any one of symbol 0-13, while PUCCH format 1, 3 and 4 transmission may start from any one of symbol 0-11. Hence, overlapping between the PUCCH resources carrying HARQ-ACK and SR will frequently happen, which is different from the scenarios in the traditional wireless communication.

Although some basic agreements have been reached on how to address full overlapping between the PUCCH resources carrying HARQ-ACK and SR, further study is still needed to thoroughly solve this problem, such as how to distinguish which SR configuration is prioritized for transmission in case of multiple SR configurations in the same occasion etc. Moreover, no solution has been reached on how to deal with partial overlapping between the PUCCH resources carrying HARQ-ACK and SR.

Thus, there is a need for further complementing and improving technical solutions on the overlapping between the PUCCH resources carrying HARQ-ACK and SR.

SUMMARY OF THE PRESENT DISCLOSURE

One object of the present disclosure is to provide a technical solution for HARQ-ACK and SR transmission, which can deal with the cases that full or partial overlapping between the PUCCH resources carrying HARQ-ACK and SR happens.

According to an embodiment of the present disclosure, a method for HARQ-ACK and SR transmission may include: configuring a first PUCCH resource for a HARQ-ACK transmission; configuring a second PUCCH resource for a SR transmission; determining whether the HARQ-ACK transmission in the first PUCCH resource overlaps with the SR transmission in the second PUCCH resource in time domain; and in response to that the HARQ-ACK transmission in the first PUCCH resource overlaps with the SR transmission in the second PUCCH resource, dropping at least the overlapped part of one of the HARQ-ACK transmission in the first PUCCH resource and the SR transmission in the second PUCCH resource.

In an embodiment of the present disclosure, dropping at least the overlapped part of one of the HARQ-ACK transmission in the first PUCCH resource and the SR transmission in the second PUCCH resource may include dropping the whole SR transmission in the second PUCCH resource. In response to that the HARQ-ACK transmission in the first PUCCH resource and the SR transmission in the second PUCCH resource have different starting positions in the time domain, dropping at least the overlapped part of one of the HARQ-ACK transmission in the first PUCCH resource and the SR transmission in the second PUCCH resource includes dropping the overlapped part of the SR transmission in the second PUCCH resource. In response to that the starting position of the HARQ-ACK transmission in the first PUCCH resource is later than the SR transmission in the second PUCCH resource in the time domain, dropping at least the overlapped part of one of the HARQ-ACK transmission in the first PUCCH resource and the SR transmission in the second PUCCH resource includes dropping the part of the SR transmission in the second PUCCH resource after the starting position of the HARQ-ACK transmission in the first PUCCH resource. Moreover, in response to that the HARQ-ACK transmission in the first PUCCH resource and the SR transmission in the second PUCCH resource have the same starting position or the starting position of the SR transmission in the second PUCCH resource is earlier than the HARQ-ACK transmission in the first PUCCH resource in the time domain, at least one SR bit of the SR transmission may be appended to the HARQ-ACK transmission in the first PUCCH resource. SR information indicating to which SR configuration the SR transmission belongs may be contained in an uplink control information (UCI) transmission. The SR information may be an SR configuration ID or SR configuration index, and may be indicated in a way that it is used to mask the cyclic redundancy check of the bits of the UCI transmission.

In another embodiment of the present disclosure, in response to that the HARQ-ACK transmission in the first PUCCH resource and the SR transmission in the second PUCCH resource have different starting positions in the time domain, dropping at least the overlapped part of one of the HARQ-ACK transmission in the first PUCCH resource and the SR transmission in the second PUCCH resource may include dropping the whole or the overlapped part of the HARQ-ACK transmission in the first PUCCH resource.

According to an embodiment of the present disclosure, in response to that the starting position of the HARQ-ACK transmission in the first PUCCH resource is earlier than the SR transmission in the second PUCCH resource in the time domain, dropping at least the overlapped part of one of the HARQ-ACK transmission in the first PUCCH resource and the SR transmission in the second PUCCH resource may include dropping the part of the HARQ-ACK transmission in the first PUCCH resource after the starting position of the SR transmission in the second PUCCH resource.

In an embodiment of the present disclosure, the HARQ-ACK transmission in the first PUCCH resource may fully or partially overlap with the SR transmission in the second PUCCH resource in the time domain. The HARQ-ACK transmission in the first PUCCH resource may be shorter or longer than the SR transmission in the second PUCCH resource in the time domain. In another embodiment of the present disclosure, the HARQ-ACK transmission in the first PUCCH resource and the SR transmission in the second PUCCH resource may have the same length in the time domain.

Embodiments of the present disclosure also provide an apparatus for HARQ-ACK and SR transmission, which may include a processor and a memory. Computer programmable instructions for implementing a method for HARQ-ACK and SR transmission may be stored in the memory. The processor is configured to perform the computer programmable instructions to implement the method for HARQ-ACK and SR transmission, for example the method as stated above.

Embodiments of the present disclosure also provide a non-transitory, computer-readable storage medium having computer programmable instructions stored therein, wherein the computer programmable instructions are programmed to implement a method for HARQ-ACK and SR transmission, for example the method as stated above.

Embodiments of the present disclosure solve the technical problem concerning full or partial overlapping between the PUCCH resources carrying HARQ-ACK and SR, which will greatly facilitate the evolution of the New Radio wireless communication technology.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only example embodiments of the present disclosure and are not therefore to be considered to be limiting of its scope.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In the case that an user equipment (UE) can flexibly configure PUCCH resources, a PUCCH resource carrying a HARQ-ACK transmission may overlap with a PUCCH resource carrying a SR transmission, that is, the HARQ-ACK transmission and SR transmission in PUCCH collide or conflict with each other in the time domain. Thus, that is one objective of the work item on 3GPP (3rd Generation Partnership Project) to solve the overlapped transmission of HARQ-ACK and SR in PUCCH.

Embodiments of the present disclosure provide solutions capable of solving the technical problem concerning full or partial overlapping between the PUCCH resources carrying HARQ-ACK and SR transmission respectively.

According to an embodiment of the present disclosure, the basic stages of a method for HARQ-ACK and SR transmission may be summarized as: configuring a first PUCCH resource for a HARQ-ACK transmission; configuring a second PUCCH resource for a SR transmission; determining whether the HARQ-ACK transmission in the first PUCCH resource overlaps with the SR transmission in the second PUCCH resource in time domain; and in response to that the HARQ-ACK transmission in the first PUCCH resource overlaps with the SR transmission in the second PUCCH resource, dropping at least the overlapped part of one of the HARQ-ACK transmission in the first PUCCH resource and the SR transmission in the second PUCCH resource. According to embodiment of the present disclosure, he overlapped part of the HARQ-ACK transmission in the first PUCCH resource and the SR transmission in the second PUCCH resource may mean the part of the HARQ-ACK transmission in the first PUCCH resource and the SR transmission in the second PUCCH resource collide with or conflict with each other. "Dropping" may be directly cancelling or removing the whole or part of the related transmission in the originally configured PUCCH resource, i.e., not transmitting the cancelled/removed part according to an embodiment of the present disclosure; or although cancelling or removing the whole or part of the related transmission in the originally configured PUCCH resource, reconfiguring and/or transmitting the cancelled/removed part in other transmission.

According to another embodiment of the present disclosure, an apparatus for HARQ-ACK and SR transmission may basically include a processor and a memory, wherein computer programmable instructions for implementing a method for HARQ-ACK and transmission are stored in the memory. The processor may be configured to perform the computer programmable instructions to: configure a first PUCCH resource for a HARQ-ACK transmission; configure a second PUCCH resource for a SR transmission; determine whether the HARQ-ACK transmission in the first PUCCH resource overlaps with the SR transmission in the second PUCCH resource in time domain; and in response to that the HARQ-ACK transmission in the first PUCCH resource overlaps with the SR transmission in the second PUCCH resource, at least drop the overlapped part of one of the HARQ-ACK transmission in the first PUCCH resource and the SR transmission in the second PUCCH resource.

More details on the embodiments of the present disclosure will be illustrated in the following text in combination with the appended drawings.

Figure 1:
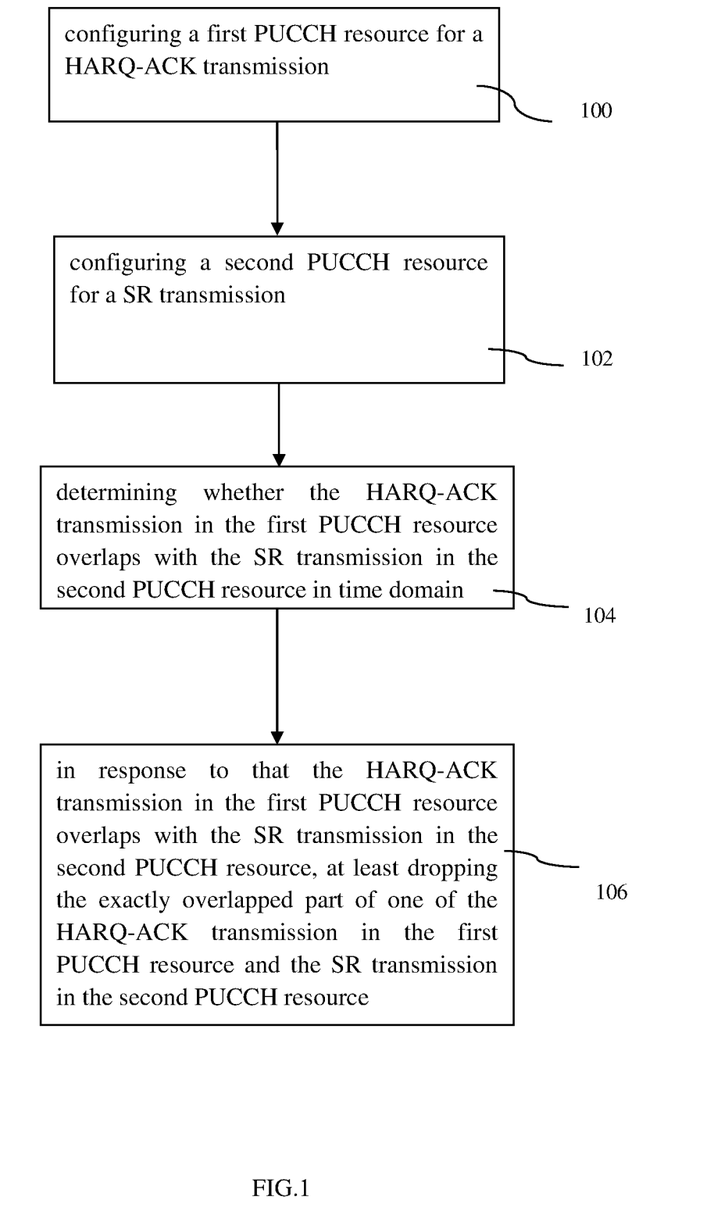
FIG. 1 is a flow chart illustrating a method for HARQ-ACK and SR transmission according to an embodiment of the present disclosure.

FIG. 1 is a flow chart illustrating a method for HARQ-ACK and SR transmission according to an embodiment of the present disclosure.

As shown in FIG. 1, according to an embodiment of the present disclosure, a method for HARQ-ACK and SR transmission may configure a first PUCCH resource for a HARQ-ACK transmission in step 100, and configure a second PUCCH resource for a SR transmission in step 102. Please note that steps 100 and 102 are only used to clearly illustrate the embodiments of the present disclosure, but not for limiting the sequence of configuring the first PUCCH resource for the HARQ-ACK transmission and the second PUCCH resource for the SR transmission. In an embodiment of the present disclosure, a HARQ-ACK transmission in the first PUCCH resource may be longer than the SR transmission in the second PUCCH resource in the time domain. In another embodiment of the present disclosure, a HARQ-ACK transmission in the first PUCCH resource may be shorter than the SR transmission in the second PUCCH resource in the time domain. In yet another embodiment of the present disclosure, a HARQ-ACK transmission in the first PUCCH resource and a SR transmission in the second PUCCH resource may have the same length in the time domain. In addition, the HARQ-ACK transmission in the first PUCCH resource and the SR transmission in the second PUCCH resource may have the same or different starting position in the time domain.

In step 104, whether the HARQ-ACK transmission in the first PUCCH resource overlaps with the SR transmission in the second PUCCH resource in time domain may be determined.

Then in step 106, in response to that the HARQ-ACK transmission in the first PUCCH resource overlaps with the SR transmission in the second PUCCH resource, the overlapped part of one of the HARQ-ACK transmission in the first PUCCH resource and the SR transmission in the second PUCCH resource may be at least dropped. When the HARQ-ACK transmission in the first PUCCH resource and the SR transmission in the second PUCCH resource have the same starting position and the same length/duration in the time domain, the HARQ-ACK transmission in the first PUCCH resource fully overlaps with the SR transmission in the second PUCCH resource. Otherwise, the HARQ-ACK transmission in the first PUCCH resource partially overlaps with the SR transmission in the second PUCCH resource in the time domain when overlapping between them occurs.

In an embodiment of the present disclosure, more part of one of the HARQ-ACK transmission in the first PUCCH resource and the SR transmission in the second PUCCH resource may be dropped dependent on the relationship between the starting position of the HARQ-ACK transmission in the first PUCCH resource and the SR transmission in the second PUCCH resource in the time domain. For persons skilled in the art, the starting position in the time domain may be starting symbol or starting occasion etc. In an embodiment of the present disclosure, a HARQ-ACK transmission in the first PUCCH resource and the SR transmission in the second PUCCH resource in the time domain may have the same starting position in the time domain. According to other embodiments of the present disclosure, the starting position of the HARQ-ACK transmission in the first PUCCH resource may be later or earlier than the SR transmission in the second PUCCH resource in the time domain.

For example, in an embodiment of the present disclosure, dropping at least the overlapped part of one of the HARQ-ACK transmission in the first PUCCH resource and the SR transmission in the second PUCCH resource may include dropping the whole SR transmission in the second PUCCH resource. In another embodiment of the present disclosure, in response to that the HARQ-ACK transmission in the first PUCCH resource and the SR transmission in the second PUCCH resource have different starting positions in the time domain, the overlapped part of the SR transmission in the second PUCCH resource may be dropped. In yet another embodiment of the present disclosure, in response to that the starting position of the HARQ-ACK transmission in the first PUCCH resource is later than the SR transmission in the second PUCCH resource in the time domain, dropping at least the overlapped part of one of the HARQ-ACK transmission in the first PUCCH resource and the SR transmission in the second PUCCH resource may include dropping the part of the SR transmission in the second PUCCH resource after the starting position of the HARQ-ACK transmission in the first PUCCH resource. Moreover, in response to that the HARQ-ACK transmission in the first PUCCH resource and the SR transmission in the second PUCCH resource have the same starting position or the starting position of the SR transmission in the second PUCCH resource is earlier than the HARQ-ACK transmission in the first PUCCH resource in time domain, at least one SR bit of the dropped SR transmission may be appended to the HARQ-ACK transmission in the first PUCCH resource. SR information indicating to which SR configuration the SR transmission belongs to may be contained in an UCI transmission. The SR information may be an SR configuration ID or SR configuration index, and may be indicated in a way that it is used to mask the cyclic redundancy check (CRC) of the bits of the UCI transmission.

According to an embodiment of the present disclosure, in response to that the HARQ-ACK transmission in the first PUCCH resource and the SR transmission in the second PUCCH resource have different starting positions in the time domain, dropping at least the overlapped part of one of the HARQ-ACK transmission in the first PUCCH resource and the SR transmission in the second PUCCH resource may include dropping the whole or the overlapped part of the HARQ-ACK transmission in the first PUCCH resource.

According to another embodiment of the present disclosure, in response to that the starting position of the HARQ-ACK transmission in the first PUCCH resource is earlier than the SR transmission in the second PUCCH resource in the time domain, dropping at least the overlapped part of one of the HARQ-ACK transmission in the first PUCCH resource and the SR transmission in the second PUCCH resource may include dropping the part of the HARQ-ACK transmission in the first PUCCH resource after the starting position of the SR transmission in the second PUCCH resource.

Figure 2:
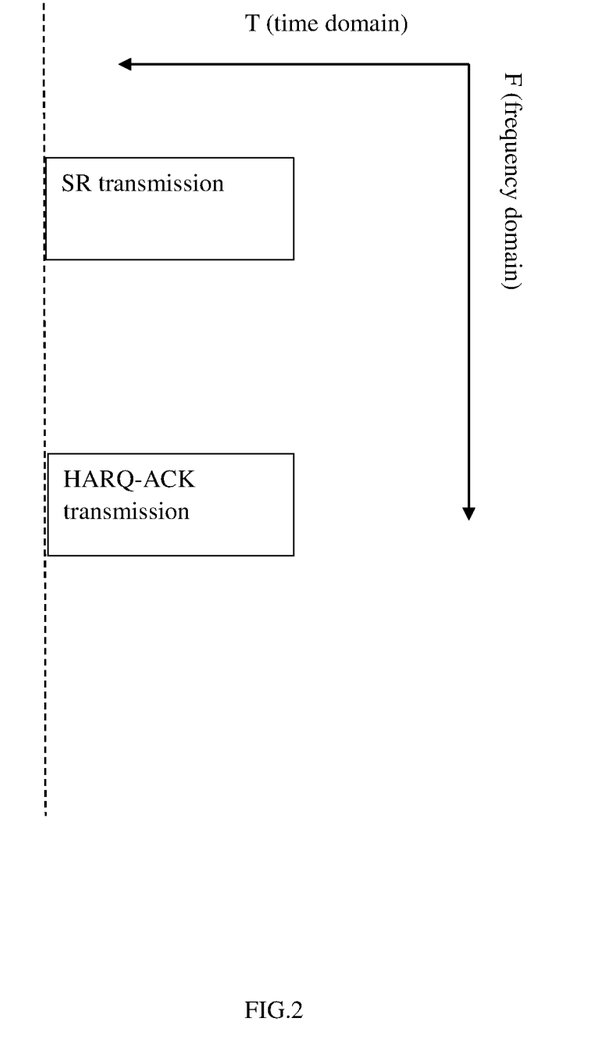
FIG. 2 illustrates an overlapping scenario about a HARQ-ACK transmission in the first PUCCH resource and the SR transmission in the second PUCCH resource in the time domain according to an embodiment of the present disclosure.

FIG. 2 illustrates an overlapping scenario about a HARQ-ACK transmission in the first PUCCH resource and the SR transmission in the second PUCCH resource in the time domain according to an embodiment of the present disclosure.

As shown in FIG. 2, in this embodiment of the present disclosure, the HARQ-ACK transmission in the first PUCCH resource overlaps with the SR transmission in the second PUCCH resource in the time domain, while they are separated in the frequency domain. The HARQ-ACK transmission in the first PUCCH resource and the SR transmission in the second PUCCH resource have the same starting position in the time domain. That is, the HARQ-ACK transmission in the first PUCCH resource and the SR transmission in the second PUCCH resource shown in FIG. 2 have the same length and the same starting position in the time domain, and they are fully overlapped with each other.

To solve the overlapping between the HARQ-ACK transmission in the first PUCCH resource and the SR transmission in the second PUCCH resource, according to an embodiment of the present disclosure, the whole SR transmission in the second PUCCH resource including the overlapping part may be dropped in response to the HARQ-ACK transmission in the first PUCCH resource and the SR transmission in the second PUCCH resource have the same starting position in the time domain.

Although the HARQ-ACK transmission in the first PUCCH resource shown in FIG. 2 and the SR transmission in the second PUCCH resource have the same length/duration in the time domain, the length of the HARQ-ACK transmission in the first PUCCH resource may be longer or shorter than the SR transmission in the second PUCCH resource in the time domain in other embodiments of the present disclosure, that is, they are partially overlapped with each other. For example, in the case that the HARQ-ACK transmission in the first PUCCH resource has a shorter duration than the SR transmission in the second PUCCH resource in the time domain, the whole SR transmission in the second PUCCH resource including the overlapping part may be dropped when the HARQ-ACK transmission and the SR transmission have the same starting position in the time domain.

According to an embodiment of the present disclosure, in addition to dropping the whole SR transmission, at least one SR bit of the SR transmission may be appended to the HARQ-ACK transmission in the first PUCCH resource. For example, one SR bit may be appended in the end of the HARQ-ACK transmission in the first PUCCH resource. SR information indicating which SR configuration the SR transmission belongs to may be contained in an UCI transmission, which may be an SR configuration ID or SR configuration index etc. The SR information may be indicated in a way that it is used to mask the CRC of the bits of the UCI transmission.

Figure 3:
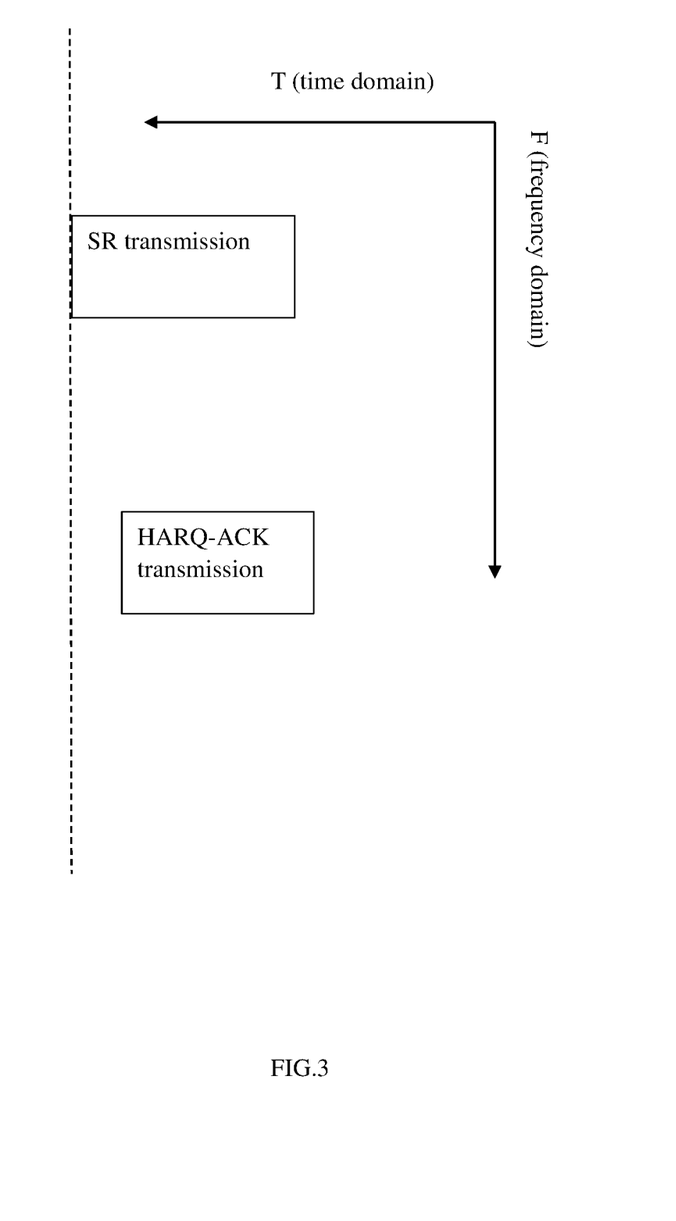
FIG. 3 illustrates an overlapping scenario about a HARQ-ACK transmission in the first PUCCH resource and the SR transmission in the second PUCCH resource in the time domain according to another embodiment of the present disclosure.

FIG. 3 illustrates an overlapping scenario about a HARQ-ACK transmission in the first PUCCH resource and the SR transmission in the second PUCCH resource in the time domain according to another embodiment of the present disclosure.

As shown in FIG. 3, in this embodiment of the present disclosure, the HARQ-ACK transmission in the first PUCCH resource partially overlaps with the SR transmission in the second PUCCH resource in the time domain, while they are separated in the frequency domain. The starting position of the HARQ-ACK transmission in the first PUCCH resource is later than the SR transmission in the second PUCCH resource in the time domain. To solve the overlapping between the HARQ-ACK transmission in the first PUCCH resource and the SR transmission in the second PUCCH resource, various solutions may be adopted in addition to dropping the whole SR transmission in the second PUCCH resource as stated above.

According to an embodiment of the present disclosure, the whole HARQ-ACK transmission in the first PUCCH resource including the overlapping part may be dropped in response to that the starting position of the HARQ-ACK transmission in the first PUCCH resource is later than the SR transmission in the second PUCCH resource in the time domain. Although the HARQ-ACK transmission in the first PUCCH resource shown in FIG. 3 is shorter than the SR transmission in the second PUCCH resource in the time domain, the length of the HARQ-ACK transmission in the first PUCCH resource may be longer than or as the same as the SR transmission in the second PUCCH resource in the time domain in other embodiments of the present disclosure. For example, in the case that the HARQ-ACK transmission in the first PUCCH resource has a longer length/duration than the SR transmission in the second PUCCH resource in the time domain, the whole HARQ-ACK transmission in the first PUCCH resource may be dropped in response to the starting position of the HARQ-ACK transmission in the first PUCCH resource is later than the SR transmission in the second PUCCH resource in the time domain.

According to another embodiment of the present disclosure, in the overlapping scenario shown in FIG. 3, that is, the HARQ-ACK transmission in the starting position of the HARQ-ACK transmission in the first PUCCH resource is later than the SR transmission in the second PUCCH resource in the time domain, only the part of the HARQ-ACK transmission in the first PUCCH resource overlapping with the SR transmission in the second PUCCH resource will be dropped. Although the HARQ-ACK transmission in the first PUCCH resource shown in FIG. 3 is shorter than the SR transmission in the second PUCCH resource in the time domain, the length of the HARQ-ACK transmission in the first PUCCH resource may be longer than or as the same as the SR transmission in the second PUCCH resource in the time domain in other embodiments of the present disclosure. For example, in the case that the HARQ-ACK transmission in the first PUCCH resource has a longer duration than the SR transmission in the second PUCCH resource in the time domain, only the part of the HARQ-ACK transmission in the first PUCCH resource overlapping the SR transmission in the second PUCCH resource may be dropped in response to the starting position of the HARQ-ACK transmission in the first PUCCH resource is later than the SR transmission in the second PUCCH resource in the time domain.

According to yet another embodiment of the present disclosure, in the overlapping scenario shown in FIG. 3, that is, the starting position of the HARQ-ACK transmission in the first PUCCH resource is later than the SR transmission in the second PUCCH resource in the time domain, only the part of the SR transmission in the second PUCCH resource overlapping with the HARQ-ACK transmission in the first PUCCH resource will be dropped. Although the HARQ-ACK transmission in the first PUCCH resource shown in FIG. 3 is shorter than the SR transmission in the second PUCCH resource in the time domain, the length of the HARQ-ACK transmission in the first PUCCH resource may be longer than or as the same as the SR transmission in the second PUCCH resource in the time domain in other embodiments of the present disclosure. For example, in the case that the HARQ-ACK transmission in the first PUCCH resource and the SR transmission in the second PUCCH resource have the same length in the time domain, only the part of the SR transmission in the second PUCCH resource overlapping the HARQ-ACK transmission in the first PUCCH resource may be dropped in response to the starting position of the HARQ-ACK transmission in the first PUCCH resource is later than the SR transmission in the second PUCCH resource in the time domain.

According to an embodiment of the present disclosure, in the overlapping scenario shown in FIG. 3, i.e., the starting position of the HARQ-ACK transmission in the first PUCCH resource is later than the SR transmission in the second PUCCH resource in the time domain, the part of the SR transmission in the second PUCCH resource after the starting position of the HARQ-ACK transmission in the first PUCCH resource may be dropped. That means, when the ending position of the HARQ-ACK transmission in the first PUCCH resource is earlier than the SR transmission in the second PUCCH resource, more part of the SR transmission in the second PUCCH resource in addition to the overlapping part will be dropped.

According to an embodiment of the present disclosure, in the overlapping scenario shown in FIG. 3, in addition to dropping the part of the SR transmission in the second PUCCH resource, at least one SR bit of the SR transmission may be appended to the HARQ-ACK transmission in the first PUCCH resource, for example, being appended in the end of the HARQ-ACK transmission in the first PUCCH resource. SR information indicating which SR configuration the SR transmission belongs to may be contained in an UCI transmission, which may be an SR configuration ID or SR configuration index etc. The SR information may be indicated in a way that it is used to mask the CRC of the bits of the UCI transmission. Similarly, although the HARQ-ACK transmission in the first PUCCH resource shown in FIG. 3 is shorter than the SR transmission in the second PUCCH resource in the time domain, the length of the HARQ-ACK transmission in the first PUCCH resource may be longer than or as the same as the SR transmission in the second PUCCH resource in the time domain in other embodiments of the present disclosure. For example, in the case that the HARQ-ACK transmission in the first PUCCH resource and the SR transmission in the second PUCCH resource have the same length in the time domain, at least one SR bit of the SR transmission may be appended to the HARQ-ACK transmission in the first PUCCH resource in addition to dropping the part of the SR transmission in the second PUCCH resource when the starting position of the SR transmission in the second PUCCH resource is earlier than the HARQ-ACK transmission in the first PUCCH resource in the time domain.

Figure 4:
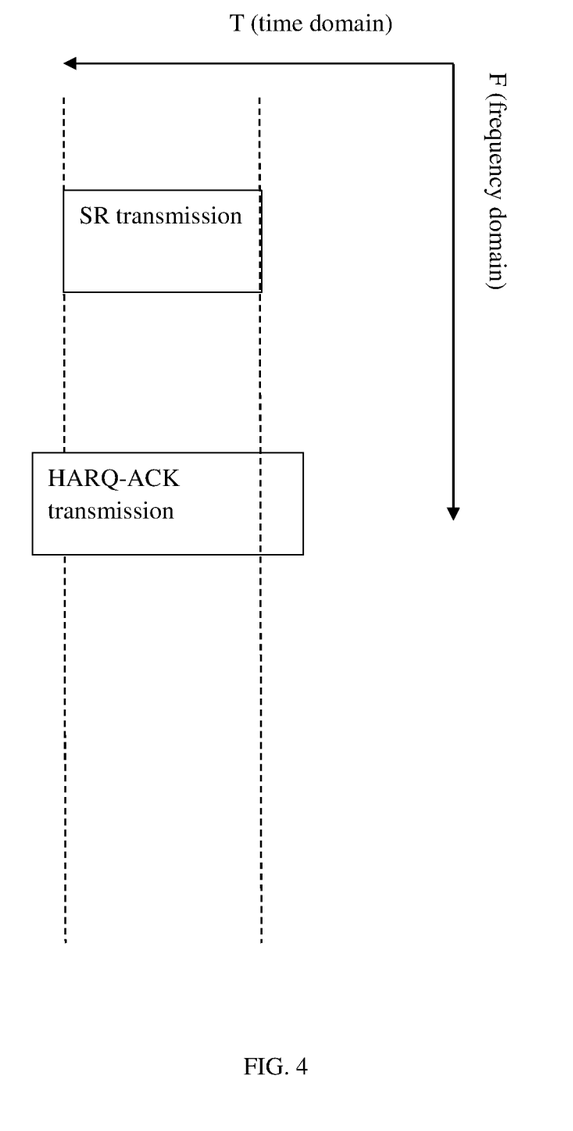
FIG. 4 illustrates an overlapping scenario about a HARQ-ACK transmission in the first PUCCH resource and the SR transmission in the second PUCCH resource in the time domain according to yet another embodiment of the present disclosure.

FIG. 4 illustrates an overlapping scenario about a HARQ-ACK transmission in the first PUCCH resource and the SR transmission in the second PUCCH resource in the time domain according to yet another embodiment of the present disclosure.

As shown in FIG. 4, in this embodiment of the present disclosure, the HARQ-ACK transmission in the first PUCCH resource also partially overlaps with the SR transmission in the second PUCCH resource in the time domain, while they are separated in the frequency domain. The starting position of the HARQ-ACK transmission in the first PUCCH resource is earlier than the SR transmission in the second PUCCH resource in the time domain. To solve the overlapping between the HARQ-ACK transmission in the first PUCCH resource and the SR transmission in the second PUCCH resource, various solutions may be adopted in addition to dropping the whole HARQ-ACK transmission or SR transmission in the second PUCCH resource as stated above.

According to an embodiment of the present disclosure, in the overlapping scenario shown in FIG. 4, that is, the HARQ-ACK transmission in the starting position of the HARQ-ACK transmission in the first PUCCH resource is earlier than the SR transmission in the second PUCCH resource in the time domain, only the part of the HARQ-ACK transmission in the first PUCCH resource overlapping with the SR transmission in the second PUCCH resource will be dropped. Although the HARQ-ACK transmission in the first PUCCH resource shown in FIG. 4 is longer than the SR transmission in the second PUCCH resource in the time domain, the length of the HARQ-ACK transmission in the first PUCCH resource may be shorter than or as the same as the SR transmission in the second PUCCH resource in the time domain in other embodiments of the present disclosure. For example, in the case that the HARQ-ACK transmission in the first PUCCH resource has a shorter duration than the SR transmission in the second PUCCH resource in the time domain, only the part of the HARQ-ACK transmission in the first PUCCH resource overlapping the SR transmission in the second PUCCH resource may be dropped in response to the starting position of the HARQ-ACK transmission in the first PUCCH resource is earlier than the SR transmission in the second PUCCH resource in the time domain.

According to another embodiment of the present disclosure, in the overlapping scenario shown in FIG. 4, that is, the starting position of the HARQ-ACK transmission in the first PUCCH resource is earlier than the SR transmission in the second PUCCH resource in the time domain, only the part of the SR transmission in the second PUCCH resource overlapping with the HARQ-ACK transmission in the first PUCCH resource will be dropped. Although the HARQ-ACK transmission in the first PUCCH resource shown in FIG. 4 is longer than the SR transmission in the second PUCCH resource in the time domain, the length of the HARQ-ACK transmission in the first PUCCH resource may be shorter than or as the same as the SR transmission in the time domain in other embodiments of the present disclosure. For example, in the case that the HARQ-ACK transmission in the first PUCCH resource is shorter than the SR transmission in the second PUCCH resource in the time domain, only the part of the SR transmission in the second PUCCH resource overlapping the HARQ-ACK transmission in the first PUCCH resource may be dropped in response to the starting position of the HARQ-ACK transmission in the first PUCCH resource is earlier than the SR transmission in the second PUCCH resource in the time domain.

According to yet another embodiment of the present disclosure, in the overlapping scenario shown in FIG. 4, that is, the starting position of the HARQ-ACK transmission in the first PUCCH resource is earlier than the SR transmission in the second PUCCH resource in the time domain, the part of the HARQ-ACK transmission in the first PUCCH resource after the starting position of the SR transmission in the second PUCCH resource may be dropped. That means, when the ending position of the HARQ-ACK transmission in the first PUCCH resource is later than the SR transmission in the second PUCCH resource, more part of the HARQ-ACK transmission in the first PUCCH resource in addition to the overlapping part will be dropped.

The method of the present disclosure can be implemented on an apparatus, a programmed processor, or an apparatus with a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in FIG. 1 may be used to implement the processor functions of this disclosure.

For example, in an embodiment of the present disclosure, an apparatus, which may be an UE, may include a processor and a memory. Computer programmable instructions for implementing a method for HARQ-ACK and SR transmission may be stored in the memory. The processor is configured to perform the computer programmable instructions to implement the method for HARQ-ACK and SR transmission according to various embodiments of the present disclosure. The apparatus, for example, an UE may further include a transmitter, which is configured to transmit the HARQ-ACK and SR transmission.

An alternative embodiment preferably implements the methods according to embodiments of the present application in a non-transitory, computer-readable storage medium storing computer programmable instructions. The instructions are preferably executed by computer-executable components preferably integrated with a wireless communication system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each FIG. are not necessary for operation of the disclosed embodiments. For example, persons of ordinary skill in the art of the disclosed embodiments would be enabled to make use of the teachings of the present disclosure by simply employing the elements of the independent claims. Accordingly, embodiments of the present disclosure as set forth herein are intended to be illustrative, not limiting. Various changes may be made without departing from the spirit and scope of the present disclosure.

What is claimed is:

1. A method, comprising:
   configuring a first physical uplink control channel resource for a hybrid automatic repeat request-acknowledge transmission;
   configuring a second physical uplink control channel resource for a scheduling request transmission;
   determining whether the hybrid automatic repeat request-acknowledge transmission in the first physical uplink control channel resource overlaps with the scheduling request transmission in the second physical uplink control channel resource in time domain; and
   in response to that the hybrid automatic repeat request-acknowledge transmission in the first physical uplink control channel resource overlaps with the scheduling request transmission in the second physical uplink control channel resource, dropping at least the overlapped part of one of the hybrid automatic repeat request-acknowledge transmission in the first physical uplink control channel resource and the scheduling request transmission in the second physical uplink control channel resource,
   wherein in response to that the hybrid automatic repeat request-acknowledge transmission in the first physical uplink control channel resource and the scheduling request transmission in the second physical uplink control channel resource have the same starting position or the starting position of the scheduling request transmission in the second physical uplink control channel resource is earlier than the hybrid automatic repeat request-acknowledge transmission in the first physical uplink control channel resource in the time domain, at least one scheduling request bit of the scheduling request transmission is appended to the hybrid automatic repeat request-acknowledge transmission in the first physical uplink control channel resource,
   wherein scheduling request information indicating to which scheduling request configuration the scheduling request transmission belongs is contained in an uplink control information transmission,
   wherein the scheduling request information is a scheduling request configuration identification or scheduling request configuration index, and
   wherein the scheduling request configuration identification or the scheduling request configuration index is indicated in a way that it is used to mask the cyclic redundancy check of the bits of the uplink control information transmission.

2. The method according to claim 1, wherein dropping at least the overlapped part of one of the hybrid automatic repeat request-acknowledge transmission in the first physical uplink control channel resource and the scheduling request transmission in the second physical uplink control channel resource includes dropping all of the scheduling request transmission in the second physical uplink control channel resource.

3. The method according to claim 2, wherein the hybrid automatic repeat request-acknowledge transmission in the first physical uplink control channel resource fully overlaps with the scheduling request transmission in the second physical uplink control channel resource in the time domain.

4. The method according to claim 2, wherein the hybrid automatic repeat request-acknowledge transmission in the first physical uplink control channel resource partially overlaps with the scheduling request transmission in the second physical uplink control channel resource in the time domain.

5. The method according to claim 2, wherein the hybrid automatic repeat request-acknowledge transmission in the first physical uplink control channel resource is shorter than the scheduling request transmission in the second physical uplink control channel resource in the time domain.

6. The method according to claim 2, wherein the hybrid automatic repeat request-acknowledge transmission in the first physical uplink control channel resource is longer than the scheduling request transmission in the second physical uplink control channel resource in the time domain.

7. The method according to claim 2, wherein the hybrid automatic repeat request-acknowledge transmission in the first physical uplink control channel resource and the scheduling request transmission in the second physical uplink control channel resource have the same length in the time domain.

8. The method according to claim 1, wherein in response to that the hybrid automatic repeat request-acknowledge transmission in the first physical uplink control channel resource and the scheduling request transmission in the second physical uplink control channel resource have different starting positions in the time domain, dropping at least the overlapped part of one of the hybrid automatic repeat request-acknowledge transmission in the first physical uplink control channel resource and the scheduling request transmission in the second physical uplink control channel resource includes dropping the exactly overlapped part of the scheduling request transmission in the second physical uplink control channel resource.

9. The method according to claim 1, wherein in response to that a starting position of the hybrid automatic repeat request-acknowledge transmission in the first physical uplink control channel resource is later than the scheduling request transmission in the second physical uplink control channel resource in the time domain, dropping at least the overlapped part of one of the hybrid automatic repeat request-acknowledge transmission in the first physical uplink control channel resource and the scheduling request transmission in the second physical uplink control channel resource includes dropping the part of the scheduling request transmission in the second physical uplink control channel resource after the starting position of the hybrid automatic repeat request-acknowledge transmission in the first physical uplink control channel resource.

10. The method according to claim 1, wherein in response to that the hybrid automatic repeat request-acknowledge transmission in the first physical uplink control channel resource and the scheduling request transmission in the second physical uplink control channel resource have different starting positions in the time domain, dropping at least the overlapped part of one of the hybrid automatic repeat request-acknowledge transmission in the first physical uplink control channel resource and the scheduling request transmission in the second physical uplink control channel resource includes dropping the whole or the overlapped part of the hybrid automatic repeat request-acknowledge transmission in the first physical uplink control channel resource.

11. The method according to claim 1, wherein in response to that a starting position of the hybrid automatic repeat request-acknowledge transmission in the first physical uplink control channel resource is earlier than the scheduling request transmission in the second physical uplink control channel resource in the time domain, dropping at least the overlapped part of one of the hybrid automatic repeat request-acknowledge transmission in the first physical uplink control channel resource and the scheduling request transmission in the second physical uplink control channel resource includes dropping the part of the hybrid automatic repeat request-acknowledge transmission in the first physical uplink control channel resource after the starting position of the scheduling request transmission in the second physical uplink control channel resource.

12. An apparatus, comprising:
a processor; and
a memory, wherein computer programmable instructions for implementing a method for hybrid automatic repeat request-acknowledge and scheduling request transmission are stored in the memory, and the processor is configured to perform the computer programmable instructions to:
configure a hybrid automatic repeat request-acknowledge transmission in a first physical uplink control channel resource;
configure a scheduling request transmission in a second physical uplink control channel resource;
determine whether the hybrid automatic repeat request-acknowledge transmission in the first physical uplink control channel resource overlaps with the scheduling request transmission in the second physical uplink control channel resource in time domain; and
in response to that the hybrid automatic repeat request-acknowledge transmission in the first physical uplink control channel resource overlaps with the scheduling request transmission in the second physical uplink control channel resource, at least drop the overlapped part of one of the hybrid automatic repeat request-acknowledge transmission in the first physical uplink control channel resource and the scheduling request transmission in the second physical uplink control channel resource,
wherein in response to that the hybrid automatic repeat request-acknowledge transmission in the first physical uplink control channel resource and the scheduling request transmission in the second physical uplink control channel resource have the same starting position or the starting position of the scheduling request transmission in the second physical uplink control channel resource is earlier than the hybrid automatic repeat request-acknowledge transmission in the first physical uplink control channel resource in the time domain, at least one scheduling request bit of the scheduling request transmission is appended to the hybrid automatic repeat request-acknowledge transmission in the first physical uplink control channel resource,
wherein scheduling request information indicating to which scheduling request configuration the scheduling request transmission belongs is contained in an uplink control information transmission,
wherein the scheduling request information is a scheduling request configuration identification or scheduling request configuration index, the scheduling request configuration identification or the scheduling request configuration index is indicated in a way that it is used to mask the cyclic redundancy check of the bits of the uplink control information transmission.

13. The apparatus according to claim 12, wherein in response to that the hybrid automatic repeat request-acknowledge transmission in the first physical uplink control channel resource and the scheduling request transmission in the second physical uplink control channel resource have different starting positions in the time domain, the processor is configured to drop the overlapped part of the scheduling request transmission in the second physical uplink control channel resource.

14. The apparatus according to claim 12, wherein in response to that a starting position of the hybrid automatic repeat request-acknowledge transmission in the first physical uplink control channel resource is later than the scheduling request transmission in the second physical uplink control channel resource in the time domain, dropping at least the overlapped part of one of the hybrid automatic repeat request-acknowledge transmission in the first physical uplink control channel resource and the scheduling request transmission in the second physical uplink control channel resource includes dropping the part of the scheduling request transmission in the second physical uplink control channel resource after the starting position of the hybrid automatic repeat request-acknowledge transmission in the first physical uplink control channel resource.

15. The apparatus according to claim 12, wherein in response to that the hybrid automatic repeat request-acknowledge transmission in the first physical uplink control channel resource and the scheduling request transmission in the second physical uplink control channel resource have different starting positions in the time domain, the processor is configured to drop the whole or the overlapped part of the hybrid automatic repeat request-acknowledge transmission in the first physical uplink control channel resource.

* * * * *